(12) United States Patent
Pendleton (10) Patent No.: US 11,382,343 B1
(45) Date of Patent: Jul. 12, 2022

(54) PELLETING SYSTEM

(71) Applicant: Performance Livestock & Feed Company, Inc., Lawsonville, NC (US)

(72) Inventor: Jason M. Pendleton, Lawsonville, NC (US)

(73) Assignee: Project Plaid, LLC, Lawsonville, NC (US)

( * ) Notice: Subject to any disclaimer, the term of this patent is extended or adjusted under 35 U.S.C. 154(b) by 483 days.

(21) Appl. No.: 16/127,899

(22) Filed: Sep. 11, 2018

Related U.S. Application Data (60) Provisional application No. 62/556,780, filed on Sep. 11, 2017.

(51) Int. Cl.
| | | |
|---|---|---|
| *A23K 40/10* | (2016.01) | |
| *A23K 10/30* | (2016.01) | |
| *A23K 20/22* | (2016.01) | |
| *A23K 30/00* | (2016.01) | |
| *A23K 20/28* | (2016.01) | |
| *A23K 20/26* | (2016.01) | |
| *A23K 20/24* | (2016.01) | |

(52) U.S. Cl.
CPC .............. *A23K 40/10* (2016.05); *A23K 10/30* (2016.05); *A23K 20/22* (2016.05); *A23K 20/24* (2016.05); *A23K 20/26* (2016.05); *A23K 20/28* (2016.05); *A23K 30/00* (2016.05)

(58) Field of Classification Search
CPC ...... A23N 17/005; A23K 40/10; A23K 20/22; A23K 20/24; A23K 20/26; A23K 20/28; A23K 10/30; A23K 30/00
See application file for complete search history.

(56) References Cited

U.S. PATENT DOCUMENTS

| | | | |
|---|---|---|---|
| 5,206,041 A | 4/1993 | Wellons | 426/2 |
| 5,871,802 A | 2/1999 | Gao et al. | 426/635 |
| 6,383,548 B1 | 7/2002 | Holt et al. | 426/635 |
| 2002/0018842 A1 | 2/2002 | Dunlow | 426/630 |
| 2008/0172933 A1* | 7/2008 | Drisdelle | C10L 9/10 44/535 |
| 2010/0281767 A1* | 11/2010 | Zeeck | F23K 1/00 44/589 |
| 2012/0301598 A1* | 11/2012 | Karges | A23K 40/25 426/624 |

OTHER PUBLICATIONS

Sokhansanj et al. Chapter 7: Steam Treatment of Cellulosic Biomass for Pelletization in "Biomass Preprocessing and Pretreatments for Production of Biofuels" CRC Press, 2017 pp. 172-174 (Year: 2017).*

* cited by examiner

*Primary Examiner* — Subbalakshmi Prakash
(74) *Attorney, Agent, or Firm* — MacCord Mason PLLC (57) ABSTRACT

A pelleting system and method for pelletizing a cellulosic fiber into feed pellets. The pelleting system includes a mixer adapted to combine a shredded cellulosic fiber with at least one additive and a preservative to form a mixture; a pellet feeder for injecting said mixture into a conditioning chamber, the conditioning chamber adapted to apply steam to the mixture to add moisture and heat to said mixture for softening the mixture to facilitate pelletizing; and a pellet mill adapted to compress the mixture to form feed pellets. The final product may be a feed pellet having a compression ratio between about 7 L/D and about 16 L/D and containing between about 9 wt. % moisture and about 12 wt. % moisture.

9 Claims, 7 Drawing Sheets

PELLETING SYSTEM

This application claims the benefit of Provisional Application No. 62/556,780 filed Sep. 11, 2017.

BACKGROUND OF THE INVENTIONS

(1) Field of the Invention

The present invention relates generally to feed pellets and, more particularly, to a system and method for forming feed pellets using cellulosic fiber.

(2) Description of the Prior Art

Pelleting is a process adopted by the US in the mid-1920's to improve feed utilization, increase the density of the feed and improve handling characteristics. The pelleting process generally involves mixing feed ingredients together and pelletizing them in a pellet mill. Most feed pellets typically incorporate readily available starch-based fibers. For fibers that are difficult to pelletize, gelatinization agents (such as starches) are added to facilitate palletization. Materials, such as bale byproducts, are notoriously difficult to pelletize, but would be of significant value to the industry as feed pellets since the byproducts may converted toward a useful purpose (e.g., feeding cattle) rather than going to waste.

Thus, there remains a need for developing a method for pelletizing cellulosic fibers, such as bale byproducts, without requiring the use of gelatinization agents. Pelletizing the cellulosic fibers enables these byproducts to be stored and handled in hoper bins, bags and bulk.

SUMMARY OF THE INVENTIONS

The present inventions are directed to a pelleting system for converting shredded cellulosic fiber into feed pellets. The design the pelleting system eliminates the need for adding gelatinization agents, such as starch, to form the feed pellets.

The pelleting system includes a mixer adapted to combine a shredded cellulosic fiber with at least one additive and a preservative to form a mixture; a pellet feeder for injecting the mixture into a conditioning chamber, said conditioning chamber adapted to apply steam to the mixture to add moisture and heat to the mixture for softening the mixture to facilitate pelletizing; and a pellet mill adapted to compress the mixture to form feed pellets. A feeder screw may be used to regulate the amount of the mixture entering into the conditioning chamber.

The pelleting system may further include a pellet cooler for drying and reducing the temperature of the feed pellets to harden the feed pellets formed by said pellet mill. A conveyor system may be used to transfer the feed pellets from the pellet mill to the pellet cooler. In some embodiments, the pellet cooler has an internal air temperature of about 10° F. lower than ambient air temperature to cool said feed pellets. For example, the pellet cooler may have an internal air temperature of about 60° F. wherein the ambient air temperature is about 70° F. The pellet cooler may be configured to dry the feed pellets until the feed pellets contain between about 9 wt. % moisture and about 12 wt. % moisture. For instance, the feed pellets may be dried until the feed pellets contains about 10 wt. % moisture. A storage bin may be added for storing the feed pellets after the feed pellets are dried and cooled.

A surge bin may also be included for regulating the amount of the mixture conveyed to the pellet feeder. The surge bin may include a metered conveyance system to regulate the amount of the mixture conveyed to the pellet feeder. For example, the metered conveyance system comprises a vaiable frequency drive. A dragline feeder may be used to transfer the mixture from the surge bin to the pellet feeder.

In some embodiments, the pelleting system includes a mechanical dust collector for removing dust from said feed pellets. A shaker may also be included for removing fines from said feed pellets.

Accordingly, one aspect of the present inventions is to provide a pelleting system including a mixer adapted to combine a shredded cellulosic fiber with at least one additive and a preservative to form a mixture; a pellet feeder for injecting the mixture into a conditioning chamber, the conditioning chamber adapted to apply steam at a temperature range between about 150° F. and about 210° F. to the mixture to add moisture and heat to the mixture for softening the mixture to facilitate pelletizing; and a pellet mill adapted to compress the mixture to form feed pellets.

The steam applied by the conditioning chamber may range between about 170° F. and about 200° F. In an embodiment, the steam applied by the conditioning chamber is between about 175° F. and about 195° F. In a further embodiment, the steam applied by the conditioning chamber is about 180° F.

The pellet mill may be adapted to compress feed pellets at a compression ratio ranging between about 7 L/D and about 16 L/D. For example, the compression ratio of the pellet mill may be between about 8 L/D and about 13 L/D. For instance, the compression ratio of the pellet mill may be about 11 L/D.

Another aspect of the present inventions is to provide a pelleting system for converting shredded cellulosic fiber into feed pellets including: a mixer adapted to combine a shredded cellulosic fiber with at least one additive and a preservative to form a mixture; a pellet feeder for injecting the mixture into a conditioning chamber, the conditioning chamber adapted to apply steam at a temperature range between about 150° F. and about 210° F. to said mixture to add moisture and heat to the mixture for softening the mixture to facilitate pelletizing; a pellet mill adapted to compress the mixture to form feed pellets; and a pellet cooler for drying and reducing the temperature of the feed pellets to remove moisture and to harden feed pellets formed by the pellet mill.

Still another aspect of the present inventions is to provide a feed pellet comprising a cellulosic fiber having a compression ratio between about 7 L/D and about 16 L/D and containing between about 9 wt. % moisture and about 12 wt. % moisture. The feed pellet may have a compression ratio between about 8 L/D and about 13 L/D. For instance, the compression ratio may be about 11 L/D.

The feed pellet may comprise a cellulosic fiber selected from the group comprising cotton, hemp, switchgrass, sage, alfalfa, and gin fiber. For example, the cellulosic fiber may be cotton from whole cotton seeds ranging between about 90% and 95% of the total composition. In another example, the cellulosic fiber may be a gin fiber ranging between about 95% and 97% of the total composition.

The feed pellet may further include a preservative. For instance, the preservative may be propionic acid. The feed pellet may further include one or more additives selected from the group comprising sodium bentonite, calcium carbonate, calcium bentonite, sodium chloride and dicalcium phosphate.

In some embodiments, the feed pellet does not include gelatinization agents. For example, the feed pellet does not include polysaccharides.

Another aspect of the present inventions is to provide methods for converting shredded cellulosic fiber into feed pellets. One example of the method comprises the steps of mixing a shredded cellulosic fiber with at least one additive and a preservative to form a mixture; providing a pellet feeder injecting the mixture into a conditioning chamber, the conditioning chamber applying steam to the mixture to add moisture and heat to the mixture for softening the mixture to facilitate pelletizing; and providing a pellet mill compressing the mixture to form feed pellets.

Another example of the method may comprise the steps of mixing a shredded cellulosic fiber with at least one additive and a preservative to form a mixture; providing a pellet feeder injecting the mixture into a conditioning chamber, the conditioning chamber applying steam at a temperature range between about 150° F. and about 210° F. to the mixture to add moisture and heat to the mixture for softening the mixture to facilitate pelletizing; and providing a pellet mill compressing the mixture to form feed pellets.

Another aspect of the present inventions is a method for converting shredded cellulosic fiber into feed pellets comprising the steps of mixing a shredded cellulosic fiber with at least one additive and a preservative to form a mixture; providing a pellet feeder injecting the mixture into a conditioning chamber, the conditioning chamber applying steam at a temperature range between about 150° F. and about 210° F. to the mixture to add moisture and heat to the mixture for softening said mixture to facilitate pelletizing; providing a pellet mill compressing the mixture to form feed pellets; and providing a pellet cooler drying and reducing the temperature of the feed pellets and removing moisture to harden the feed pellets formed by the pellet mill.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
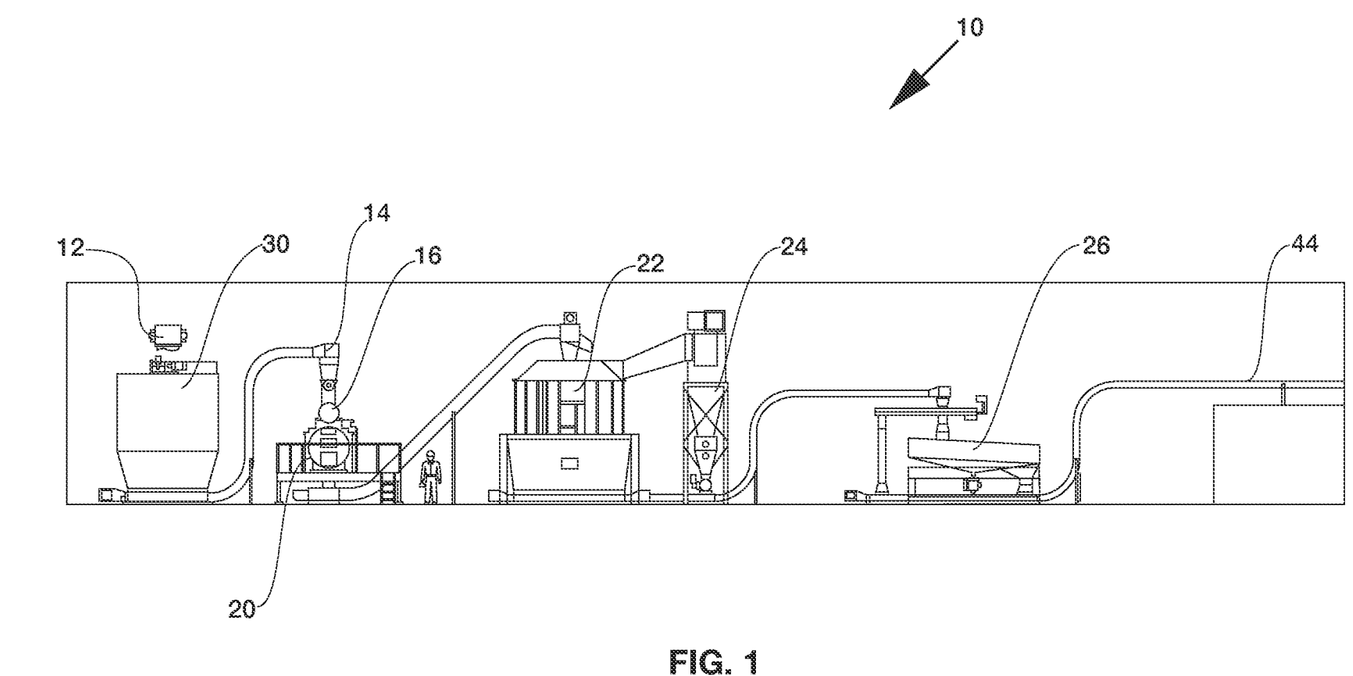
FIG. 1 is a side elevational view of a pelleting system constructed according to the present inventions.

Referring now to the drawings in general and FIG. 1 in particular, it will be understood that the illustrations are for the purpose of describing a preferred embodiment of the invention and are not intended to limit the invention thereto. As best seen in FIG. 1, a pelleting system, generally designated 10, is shown constructed according to the present inventions. The pelleting system 10 includes several sub-assemblies: a mixer 12; a pellet feeder 14; a conditioning chamber 16; a pellet mill 20; and a pellet cooler 22.

Figure 2:
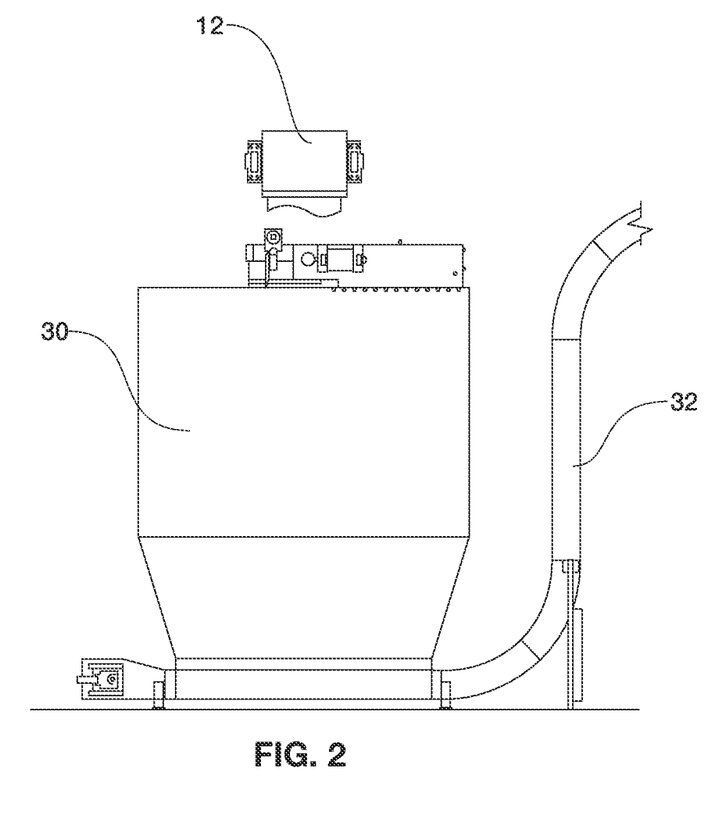
FIG. 2 is an enlarged side elevational view of the mixer and surge tank shown in FIG. 1.

Turning to FIG. 2, there is shown a side elevational view of the mixer 12 shown in FIG. 1, the view being generally schematic. Shredded cellulosic fiber is inserted into the mixer 12. Types of cellulosic fiber compatible with the pelleting system include cotton, hemp, switchgrass, sage, alfalfa, whole cottonseed, and gin fiber. The cellulosic fiber may also be combined with preservatives and other additives within the mixer 12. For example, preservatives such as propionic acid and citric acid may be mixed with the cellulosic fiber. Additives such as sodium bentonite, calcium carbonate, calcium bentonite, sodium chloride and dicalcium phosphate may also be included within the mixture.

A surge bin 30 may be added to store amounts of the mixture and regulate the amount of mixture conveyed by a dragline feeder 32 to the pellet feeder 14. For example, the surge bin may comprise an approximately 1150 cubic foot tank for storing mixtures received by the mixer 12. The surge bin 30 may be positioned directly below the mixer 12. The surge bin 30 may include a metered conveyance system to regulate the amount of mixture conveyed to the pellet feeder 14 from its storage tank. One example of a metered conveyance system compatible with the surge bin 30 is a valiable frequency drive.

Figure 3:
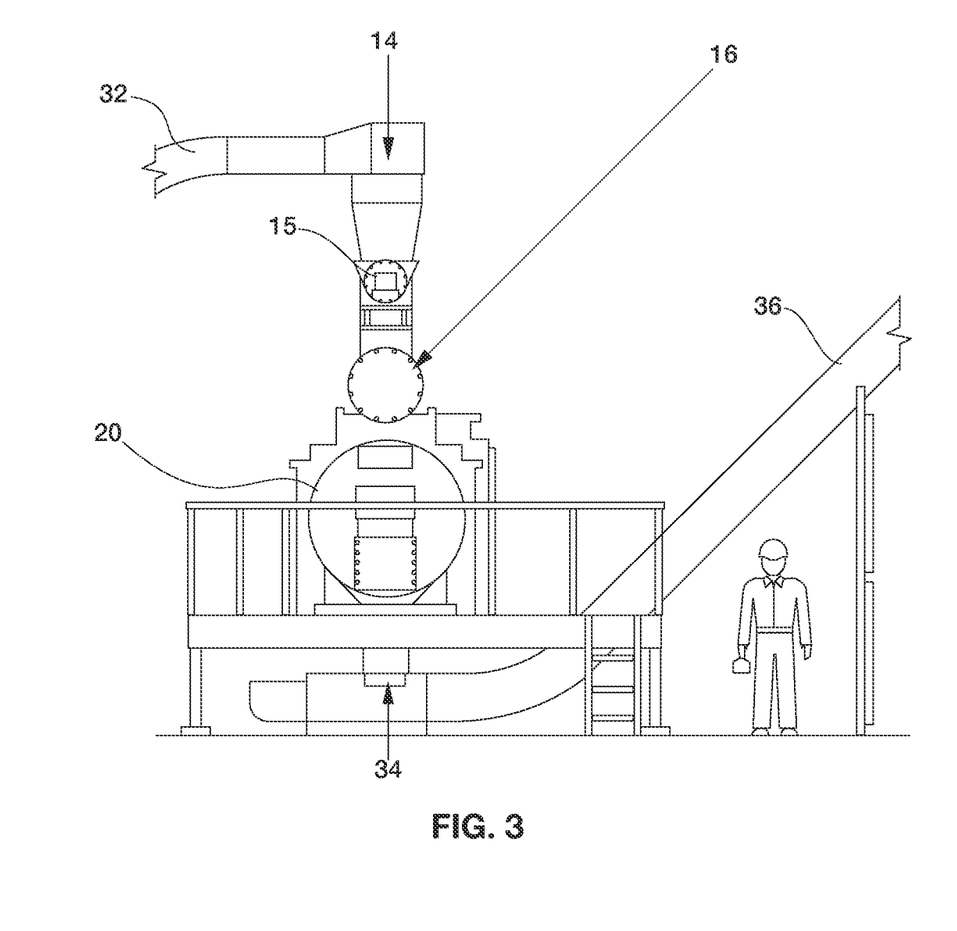
FIG. 3 is an enlarged side elevational view of the conditioning chamber and pellet mill shown in FIG. 1.

FIG. 3 illustrates the mixture conveyed from the dragline feeder 32 into a pellet feeder 14 for additional processing. The pellet feeder 14 injects a specified quantity into the conditioning chamber 16 via a feeder screw 15. The conditioning chamber 16 provides steam to the mixture to heat and moisten the mixture for pelletizing. The increased moisture content and temperature of the mixture facilitates pelletizing by the pellet mill 20. Preferably, the temperature of the steam applied by the conditioning chamber 16 ranges between about 150° F. and about 210° F.

The pellet mill 20 is responsible for converting the heated mixture from the conditioning chamber 16 into feed pellets. Pelletizing is accomplished by the pellet mill 20 by compressing the mixtures loaded into the die within the pellet mill. Preferably, the pellet mill is adapted to compress the mixtures into feed pellets having a compression ratio between about 7 L/D and about 16 L/D, wherein the compression ratio is defined as the length of the pellet over the pellet's diameter (i.e., a length to diameter ratio). For example, the feed pellets may have a 2.25 inch length and a diameter of about 7/32 inches.

Figure 4:
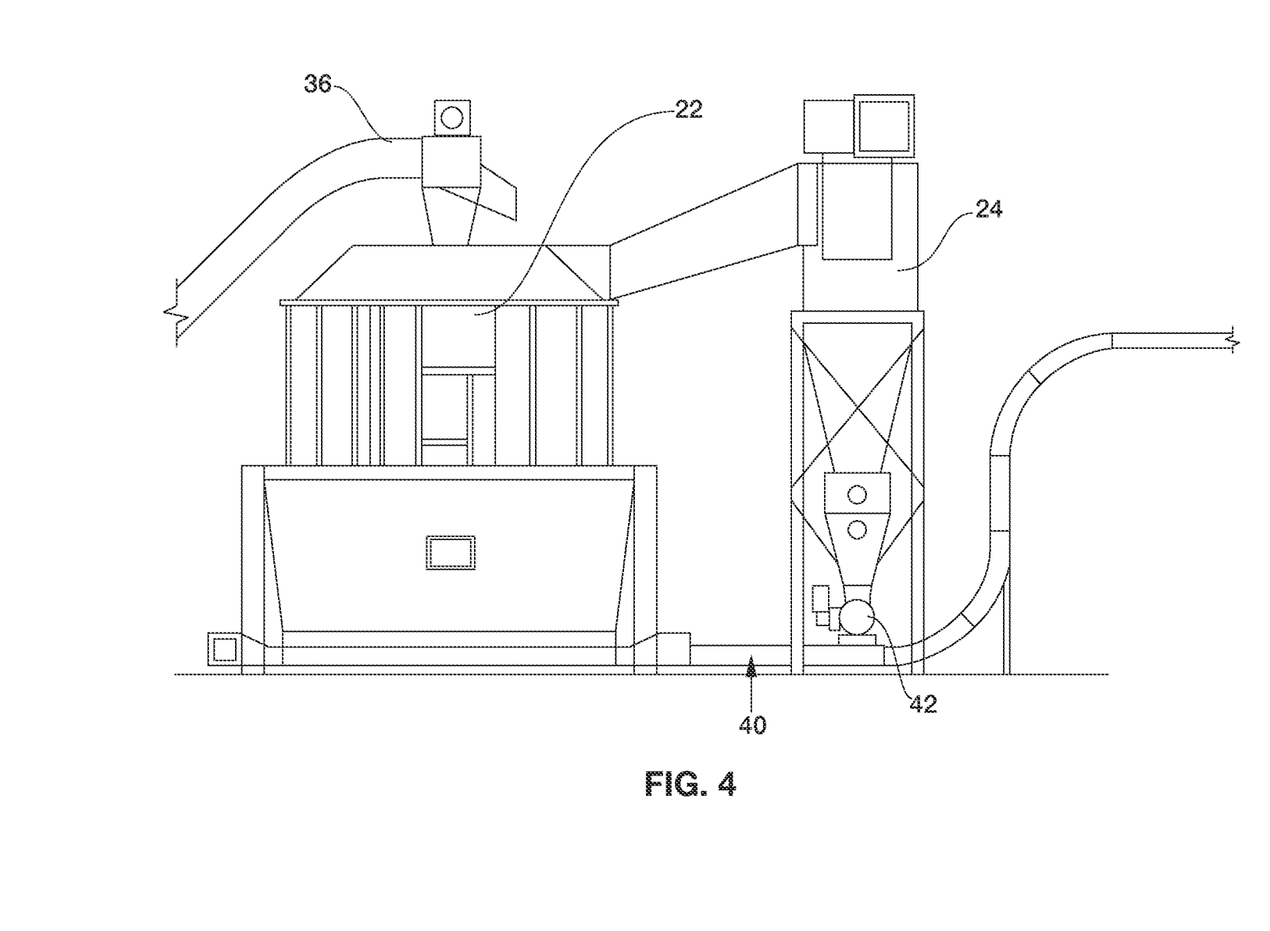
FIG. 4 is an enlarged side elevational view of the pellet cooler and mechanical dust collector shown in FIG. 1.

The feed pellets may then exit the pellet mill via chute 34 and placed onto conveyor 36 to be conveyed toward the pellet cooler 22. The chute 34 may include a metered conveyance system for regulating the quantity of pellets conveyed to the pellet cooler 22. FIG. 4 illustrates one embodiment of a pellet cooler 22, wherein the pellet cooler comprises a closed container having an internal air temperature equivalent to room temperature or lower. In one embodiment, the pellet cooler 22 has an internal air temperature equivalent to 10° F. lower than the ambient air temperature via air volume cooling. For example, the pellet cooler 22 may have an internal air temperature ranging between about 20° F. and about 70° F., dependent on the ambient air temperature. In other examples, the pellet cooler 22 may use refrigeration, such as a rig cooling system or other traditional refrigeration methods. For instance, the pellet cooler 22 may have an internal air temperature of about 10° F. using refrigeration.

The feed pellets remain in the pellet cooler 22 until the feed pellets obtain a satisfactory hardness. The moisture originally introduced by the conditioning chamber onto the feed pellets evaporates until the feed pellets contain between about 9 wt. % to about 12 wt. % moisture. Moisture levels below 9 wt. % may result in a feed pellet that is unpalatable. Moisture levels above 12 wt. % may result in a pellet with a less than satisfactory pellet density index (indicative of pellet physical quality).

Figure 5:
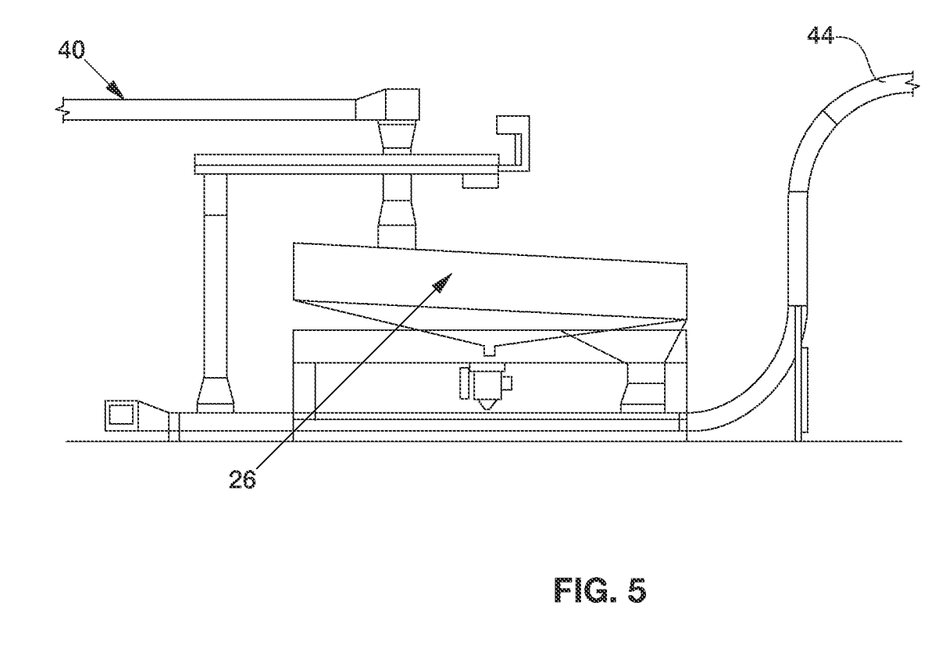
FIG. 5 is an enlarged side elevational view of the shaker shown in FIG. 1.

The cooled feed pellets may be further processed to remove contaminants such as dust and fines. For example, a mechanical dust collector 24 may be added to remove dust from feed pellets exiting the pellet cooler through conveyor 40. The mechanical dust collector 24 may further include an airlock 42 to provide a flexible air seal, allowing larger particles to easily pass through while maintaining its air seal, thereby allowing for continuous operation without the need to shut down for barrel removal or lost labor time for barrel change outs. The addition of an airlock 42 may also minimize employee exposure to dust while making the mechanical dust collector less susceptible to material back-up and damage. As seen in FIG. 5, a shaker 26 may also be included to remove fines from the feed pellets. After processing, the feed pellets may be conveyed by conveyer 44 onto a storage bin 46.

Figure 6:
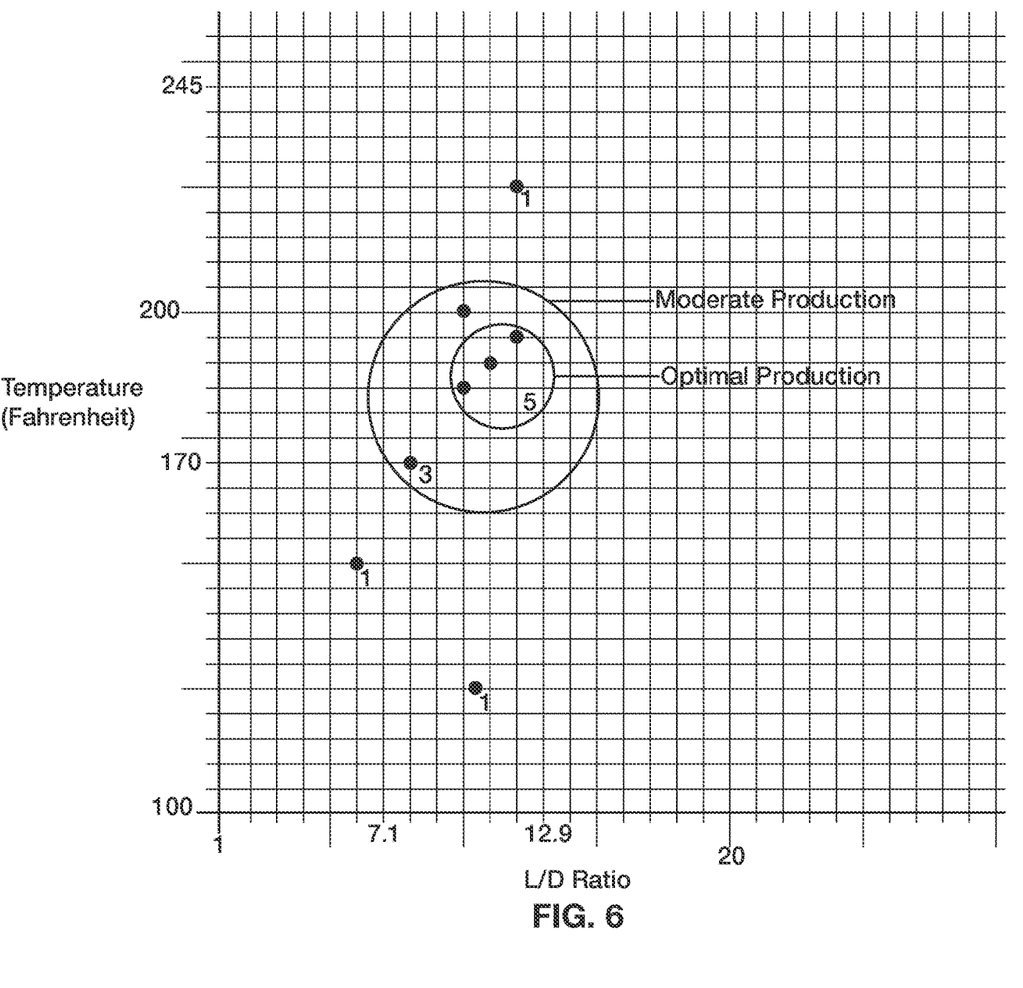
FIG. 6 is a graphical representation of a response surface illustrating the relationship of steam temperature and compression ratios on pellet quality as constructed according to the present inventions.

FIG. 6 illustrates the desired relationship between the temperature of steam applied by the conditioning chamber and the pressure applied by the pellet mill via a two-dimensional surface plot. Various temperatures and compression ratios are plotted and ranked from 1 to 5 indicating least to most desirable in terms of the feed pellet's physical qualities. The response surface shown provides a visual illustration of the effects of both temperature and compression ratios via a two-dimensional surface plot of a three-dimensional surface. The boundary conditions in FIG. 6 are denoted with solid lines, and indicate the ideal temperatures for a given range of compression ratios.

FIG. 6 indicates that the most effective compression ratios range between about 7 L/D and about 16 L/D, with the range between about 8 L/D and about 13 L/D being the most effective. Higher compression ratios generally lead to better pellet density indices, but compressing the feed pellet too highly results in a feed pellet that is too hard. The compression must balance hardness such that the feed pellet remains palatable without the feed pellet falling apart. Similarly, the effective temperatures for applied steam range between about 170° F. and about 200° F., with the most effective temperatures ranging between about 175° F. and about 195° F. Temperatures above 200° F. may scorch the feed pellet, while temperatures below 170° F. results in a lower pellet physical quality.

Figure 7:
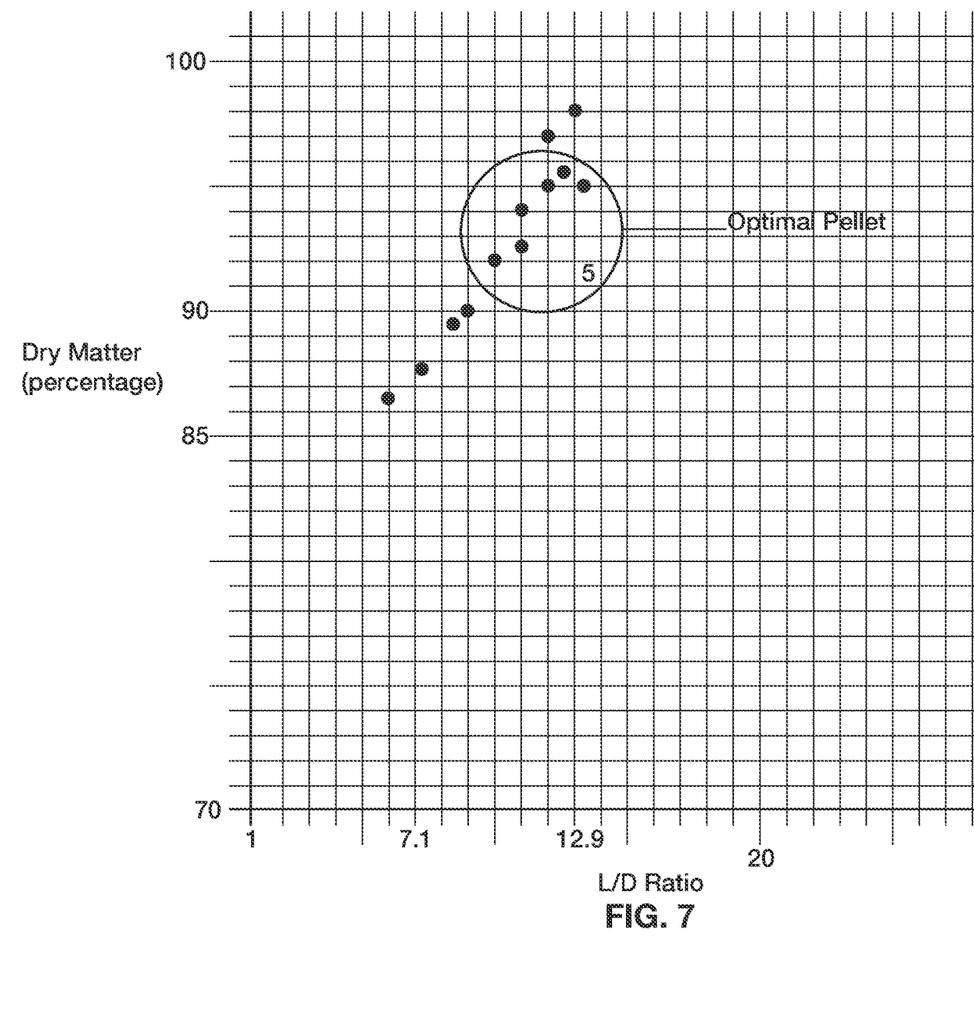
FIG. 7 is a graphical representation of a response surface illustrating the relationship of dry matter and compression ratios on pellet quality as constructed according to the present inventions.

FIG. 7 illustrates the desired relationship between the weight percent moisture (plotted as its inverse, dry matter percentage) and the pressure applied by the pellet mill via a two-dimensional surface plot. The dry matter percentage represents the overall dryness of the pellet, and is the inverse of a pellet's weight percent moisture. For instance, a pellet having a dry matter percentage of 90% has a weight percent moisture of 10%. Various dry matter percentages and compression ratios are plotted and ranked from 1 to 5 indicating least to most desirable in terms of the feed pellet's physical qualities. The response surface shown provides a visual illustration of the effects of both percent moisture levels and compression ratios via a two-dimensional surface plot of a three-dimensional surface.

FIG. 7 indicates that the highest quality pellets are between about 90% and about 96% dry (i.e., between about 4% and about 10% weight percent moisture) within a compression ratio ranging between about 8 L/D and about 13 L/D. Similar to compression ratios, the moisture levels of the pellet must balance softness such that the feed pellet remains palatable without the feed pellet falling apart.

In operation, the present inventions may also be considered as methods for pelletizing a cellulosic fiber without requiring the addition of gelatinization reagents. For example, the method may comprise shredding a cellulosic fiber, mixing the cellulosic fiber with an additive to form a mixture, heating the mixture between about 175° F. to about 190° F., loading the mixture into a pellet mill, expelling the mixture from the pellet mill to form a feed pellet, and cooling and drying a feed pellet. The cellulosic fiber may be mixed with one or more additives, such as sodium bentonite, calcium carbonate, calcium bentonite, sodium chloride, and dicalcium phosphate. A plant-based soy fiber to may also be added to the mixture.

The mixture may be heated by applying steam, and the steam may applied by injection in a conditioning chamber. The method may further include compressing the feed pellet to a compression ratio between about 8 L/D and about 13 L/D. For example, the feed pellet may be compressed to a compression ratio of about 10.3 L/D. The pellet may be cooled to about 10° F., wherein the pellet is dried until the pellet contains between about 9% to about 12% weight percent moisture.

The present inventions may also be considered a method for converting shredded cellulosic fiber into feed pellets, said method comprising the steps of mixing a shredded cellulosic fiber with at least one additive and a preservative to form a mixture, providing a pellet feeder injecting the mixture into a conditioning chamber, the conditioning chamber applying steam to said mixture to add moisture and heat to said mixture for softening the mixture to facilitate pelletizing; and providing a pellet mill compressing the mixture to form feed pellets. Preferably, the steam is applied at a said conditioning chamber applying steam at a temperature range between about 150° F. and about 210° F. The pellet may also be cooled and dried via a pellet cooler to harden the feed pellets formed by the pellet mill.

The present inventions may also be directed to a feed pellet comprising a cellulosic fiber with a compression ratio between about 7 L/D and about 16 L/D and containing between about 9 wt. % moisture and about 12 wt. % moisture. The cellulosic fiber may comprising one or more fibers such as cotton, hemp, switchgrass, sage, alfalfa, and gin fiber. For example, the cellulosic fiber may be cotton from whole cotton seeds ranging between about 90% and 95% of the total composition. As another example, the cellulosic fiber may be a gin fiber ranging between about 95% and 97% of the total composition. The feed pellet may also include preservatives, such as propionic acid. Additives may also be included in the feed pellet, such as sodium bentonite, calcium carbonate, calcium bentonite, sodium chloride and dicalcium phosphate.

The system and process by which the feed pellets are produced enables the feed pellets to be free of gelatinization agents. For example, the feed pellet may not include any starches, such as polysaccharides.

The following example illustrates one practical embodiment of the present inventions.

EXAMPLE

Ingredients: Whole Cottonseed, Processed soy fiber, then Sodium Bentonite, Calcium Carbonate, Calcium Benonite, Sodium Chloride and Di-calcium Phosphate Mixing All of the ingredients in the above formula mixed in a mixer for a period of time to get a uniform mix, and mixed 2 minutes. A homogenous, cohesive mash was obtained at end of the final mixing. Once Mixing is complete, the mix in conveyed via drag conveyor to a surge bin.

Pelleting

Mix then delivered to the pellet mill feeder via a surge bin with a metered conveyance with a Valiable Frequency drive. Mix fed into the pellet mill conditioning chamber steam is added to add moisture and heat to prepare the mix for pelleting. The mix pre pelleting will be between 175 to 190 degrees F. When the mash was compressed through the die, soft, moist pellets were formed. The pellets had a temperature will be a maximum of 195 degrees F. and a moisture content of 11-15%.

Drying/Cooling

The wet pellets were dried and cooled in a counter flow cooler/dryer to obtain a moisture content below 12%. The final product had a pellet durability index of 92.0 to 98.0.

Certain modifications and improvements will occur to those skilled in the art upon a reading of the foregoing description. By way of example, feed pellets produced by the pellet mill may be cooled at room temperature without the use of a pellet cooler. It should be understood that all such modifications and improvements have been deleted herein for the sake of conciseness and readability but are properly within the scope of the following claims.

I claim:

1. A method for converting shredded cellulosic fiber into feed pellets, the method comprising the steps of:
   (a) providing a pelleting system consisting essentially of a mixer; a feeder; a conditioner; a pellet mill; and a cooler;
   (b) combining shredded cellulosic fiber selected from the group consisting of cotton, hemp, switchgrass, sage, alfalfa, and gin fiber and combinations thereof with at least one food additive selected from the group comprising sodium bentonite, calcium carbonate, calcium bentonite, sodium chloride and dicalcium phosphate to form a mixture substantially free of gelatinizing agents;
   (c) injecting said mixture into a conditioning chamber and applying steam at a temperature range between about 160° F. and about 205° F. to said mixture to add moisture and heat to said mixture for softening said mixture to facilitate pelletizing;
   (d) compressing said mixture to form feed pellets, wherein the compression ratio of said pellet mill is greater than about 7 L/D and less than about 16 L/D; and
   (e) drying and reducing the temperature of said feed pellets to remove moisture and to harden said feed pellets formed by said pellet mill.

2. The method of claim 1, wherein said pellet cooler has an internal air temperature of about 10° F. to cool said feed pellets.

3. The method of claim 1, wherein said pellet cooler dries said feed pellets until said feed pellets contains between about 9.5 wt. % moisture to about 11.5 wt. % moisture.

4. The method of claim 1, wherein said pellet cooler dries said feed pellets until said feed pellets contains about 10 wt. % moisture.

5. The method of claim 1, wherein the steam applied by said conditioning chamber is between about 170° F. and about 200° F.

6. The method of claim 5, wherein the steam applied by said conditioning chamber is between about 175° F. and about 195° F.

7. The method of claim 6, wherein the steam applied by said conditioning chamber is about 180° F.

8. The method of claim 1, wherein the compression ratio of said pellet mill is between about 8 L/D and about 13 L/D.

9. The method of claim 8, wherein the compression ratio of said pellet mill is about 11 L/D.

* * * * *